United States Patent
Zhang et al.

(10) Patent No.: US 12,359,271 B2
(45) Date of Patent: Jul. 15, 2025

(54) ROBOT MACHINING SYSTEM AND CONTROL METHOD FOR ULTRASONIC SURFACE ROLLING PROCESS OF AIRCRAFT ENGINE BLADE

(71) Applicants: EAST CHINA UNIVERSITY OF SCIENCE AND TECHNOLOGY, Shanghai (CN); AVIC MANUFACTURING TECHNOLOGY INSTITUTE, Beijing (CN)

(72) Inventors: Xiancheng Zhang, Shanghai (CN); Zhiqiang Li, Beijing (CN); Shuang Liu, Shanghai (CN); Xiaoning Han, Beijing (CN); Shulei Yao, Shanghai (CN); Congyang Gong, Shanghai (CN); Lin Zhu, Shanghai (CN); Kaiming Zhang, Shanghai (CN); Shantung Tu, Shanghai (CN)

(73) Assignees: EAST CHINA UNIVERSITY OF SCIENCE AND TECHNOLOGY (CN); AVIC MANUFACTURING TECHNOLOGY INSTITUTE (CN)

( * ) Notice: Subject to any disclaimer, the term of this patent is extended or adjusted under 35 U.S.C. 154(b) by 339 days.

(21) Appl. No.: 18/015,503

(22) PCT Filed: Sep. 30, 2020

(86) PCT No.: PCT/CN2020/119152
§ 371 (c)(1),
(2) Date: Jan. 10, 2023

(87) PCT Pub. No.: WO2022/011845
PCT Pub. Date: Jan. 20, 2022

(65) Prior Publication Data
US 2023/0250501 A1   Aug. 10, 2023

(30) Foreign Application Priority Data

Jul. 15, 2020 (CN) .......................... 202010682850.X

(51) Int. Cl.
*C21D 7/04* (2006.01)
*B25J 11/00* (2006.01)
*C22F 3/00* (2006.01)

(52) U.S. Cl.
CPC ............... *C21D 7/04* (2013.01); *B25J 11/005* (2013.01); *C22F 3/00* (2013.01)

(58) Field of Classification Search
CPC . C21D 7/04; C21D 7/06; B25J 11/005; C22F 3/00; C22F 1/00
See application file for complete search history.

(56) References Cited

FOREIGN PATENT DOCUMENTS

| CN | 104108105 A | * | 10/2014 |
| CN | 106283038 A | * | 1/2017 |

(Continued)

OTHER PUBLICATIONS

International Search Report with English Translation and Written Opinion for PCT Application No. PCT/CN2020/119152, dated Apr. 22, 2021, pp. 1-9.

*Primary Examiner* — Michael C Zarroli
(74) *Attorney, Agent, or Firm* — Dickinson Wright PLLC

(57) ABSTRACT

The application relates to a robot machining system and control method for ultrasonic surface rolling process of an aircraft engine blade. The robot machining system includes: a robot, to which an ultrasonic surface rolling process device is fixed, the robot drives the ultrasonic surface rolling process device to move; a base provided with a spindle turntable and a three-dimensional mobile lifting device, the spindle turntable being provided with a rotatable blade clamp, and a flexible follow-up support head being fixed to the three-dimensional mobile lifting device; and a control (Continued)

system, which is in electrical connection or communication connection with the robot, the spindle turntable and the three-dimensional mobile lifting device, respectively. According to the application, the robot assists in clamping ultrasonic rolling device and cooperates with the three-dimensional mobile lifting device and the flexible follow-up support head, such that the accurate ultrasonic surface rolling process of blade is realized.

11 Claims, 5 Drawing Sheets

(56) References Cited

FOREIGN PATENT DOCUMENTS

| | | | | | |
|---|---|---|---|---|---|
| CN | 108330264 A | * | 7/2018 | ............ | C21D 11/00 |
| CN | 110560533 A | | 12/2019 | | |
| CN | 110788182 A | | 2/2020 | | |
| CN | 210587938 U | * | 5/2020 | ............... | B23P 9/02 |
| RU | 2209427 C1 | | 7/2003 | | |
| TW | M401529 U | | 4/2011 | | |

* cited by examiner

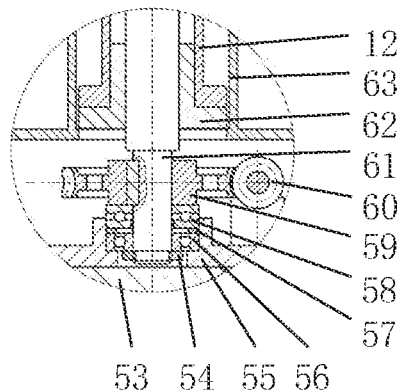

Fig. 8

Cause the blade clamp to clamp a tenon portion of the blade, causing a surface to be machined of the blade to face the ultrasonic surface rolling process device, and the flexible follow-up support head supporting an opposite surface to the surface to be machined — S1

Generate, according to a model of the blade, a zigzag machining trajectory of the ultrasonic surface rolling process device in an equal cross-section method — S2

Generate a movement trajectory of a lifting support rod according to the machining trajectory of the ultrasonic surface rolling process device — S3

Control, by a control system according to the machining trajectory of the ultrasonic surface rolling process device and the movement trajectory of the lifting support rod, the movement of the ultrasonic surface rolling process device and the lifting support rod, so as to complete strengthening of the surface to be machined of the blade — S4

Fig. 9

ROBOT MACHINING SYSTEM AND CONTROL METHOD FOR ULTRASONIC SURFACE ROLLING PROCESS OF AIRCRAFT ENGINE BLADE

CROSS-REFERENCE TO RELATED APPLICATION(S)

This present application is a national stage application of International Patent Application No. PCT/CN2020/119152, filed Sep. 30, 2020, which claims priority to Chinese Patent Application No. 202010682850.X, filed Jul. 15, 2020, the disclosures of which are hereby incorporated by reference in their entireties.

TECHNICAL FIELD

The present application relates to the field of machining of aircraft engines, and more particularly to a robot machining system and control method for ultrasonic surface rolling process of an aircraft engine blade.

BACKGROUND

As one of the most core components of aircraft engines, blades have been in service for a long time in extreme environments such as high temperature, high pressure and high speed, and are typical life-limited components. Ultrasonic surface rolling process is a new surface modification technology that combines ultrasonic shot peening with low plastic polishing. Through ultrasonic-assisted vibration, a spherical tool head hits a metal surface at a high frequency and a high amplitude, so that a plastic deformation layer is produced on the machined surface, the roughness of the metal surface is thus reduced, the hardness of the metal surface is increased, and a beneficial residual compressive stress is introduced into the material, finally achieving the purpose of prolonging the service life of the material. Studies have shown that ultrasonic surface rolling process technology has a great potential application value for prolonging the service life of aircraft engine blades. At present, research objects of ultrasonic surface rolling process are mostly test pieces such as flat plates or round bars, and most of the strengthening equipment is modified from computer numerical control (CNC) lathes or milling machines by replacing tools. The aircraft engine blades have complex curved and thin-walled features, so it is difficult to achieve accurate and effective ultrasonic surface rolling process of the aircraft engine blades by a conventional CNC machining method.

With the development of industrial robot technology, joint robots have great advantages in the application of machining complex curved workpieces with their high degrees of freedom, accessibility and good accuracy. By clamping a strengthening tool, the robot can realize strengthening along a blade surface normal. However, in the study of surface strengthening of the aircraft engine blade, it is found that, the strengthening tool with high-amplitude and high-frequency ultrasonic vibration acting on the blade will cause the flutter of the blade, and the impact force exerted by the strengthening tool on the blade will also cause the blade to greatly deform, which will seriously affect the surface modification effect of ultrasonic surface rolling process of the blade and the geometric accuracy of strengthening of the blade.

Therefore, when ultrasonic surface rolling process is performed on the aircraft engine blade, how to arrange a corresponding assisted support system such that the force exerted on the blade is as identical as possible so as to offset the deformation of the blade due to an excessive unilateral force while reducing the flutter generated by the blade in the process of ultrasonic surface rolling process is an urgent technical problem that needs to be solved by a person skilled in the art.

SUMMARY OF THE INVENTION

The present application provides a robot machining system and control method for ultrasonic surface rolling process of an aircraft engine blade. By controlling an ultrasonic surface rolling process device and a flexible follow-up support head, the force exerted on the surface of an aircraft engine blade is as identical as possible to suppress the deformation and flutter of the aircraft engine blade in the process of ultrasonic surface rolling process, and finally realize accurate ultrasonic surface rolling process of the aircraft engine blade.

In one aspect, the present application provides a robot machining system for ultrasonic surface rolling process of an aircraft engine blade, the robot machining system comprising:

a robot, to which an ultrasonic surface rolling process device is fixed, and which drives the ultrasonic surface rolling process device to move;

a base provided with a spindle turntable and a three-dimensional mobile lifting device, the spindle turntable being provided with a rotatable blade clamp, and a flexible follow-up support head being fixed to the three-dimensional mobile lifting device; and a control system, which is in electrical connection or communication connection with the robot, the spindle turntable and the three-dimensional mobile lifting device, respectively.

Further, the robot is a five-axis or six-axis robot.

Further, the spindle turntable comprises a servo motor, a reducer, a turntable base, a rotary spindle, a transition disk and a rotary encoder, wherein the reducer is fixed to the turntable base, the servo motor is connected to an input shaft of the reducer, the rotary spindle is connected to an output shaft of the reducer, the transition disk is connected to the rotary spindle, the blade clamp is arranged on the transition disk, the rotary encoder is built in the servo motor, and the control system is electrically connected to the servo motor and the rotary encoder, respectively.

Further, the three-dimensional mobile lifting device comprises a lifting support rod, an X-direction movement drive device, a Y-direction lifting drive device, and a Z-direction movement drive device; and the Z-direction movement drive device is arranged on the base, the X-direction movement drive device is connected to the Z-direction movement drive device, the Y-direction movement drive device is connected to the X-direction movement drive device, and the lifting support rod is connected to the flexible follow-up support head.

Further, the Z-direction movement drive device comprises a first actuator, a first ball screw, and a first screw nut, wherein the ball screw is arranged on the base in a Z-direction, the first actuator is connected to the ball screw, and the ball screw passes through the first screw nut and is in driving fit with the first screw nut.

Further, the X-direction movement drive device comprises a mounting plate, a second actuator, a second ball screw, and a second screw nut, wherein the mounting plate is fixed to the first screw nut, the second ball screw is arranged on the mounting plate in an X-direction, the second actuator is connected to the second ball screw, and the second ball screw passes through the second screw nut and is in driving fit with the second screw nut.

Further, the Y-direction lifting drive device comprises a lifting baseplate, and a third actuator, a worm gear, a worm, a third ball screw and a third screw nut arranged on the lifting baseplate, wherein the third ball screw is arranged in a Y-direction, the third actuator is connected to the worm, the worm gear is engaged with the worm and the third ball screw respectively, the third ball screw passes through the third screw nut and is in driving fit with the third screw nut, and the lifting support rod is connected to the third screw nut.

Further, the blade clamp comprises an upper press block, a lower press block, a left clasping block and a right clasping block.

Further, the robot machining system further comprises a control cabinet, in which the control system is arranged.

In another aspect, the present application provides a robot machining control method for ultrasonic surface rolling process of an aircraft engine blade, the method comprising at least:

step S1: providing a robot machining system for ultrasonic surface rolling process of an aircraft engine blade as described above, causing the blade clamp to clamp a tenon portion of the blade, causing a surface to be machined of the blade to face the ultrasonic surface rolling process device, and the flexible follow-up support head supporting an opposite surface to the surface to be machined;

step S2: generating, according to a model of the blade, a zigzag machining trajectory of the ultrasonic surface rolling process device in an equal cross-section method;

step S3: generating a movement trajectory of a lifting support rod according to the machining trajectory of the ultrasonic surface rolling process device; and step S4: controlling, by a control system according to the machining trajectory of the ultrasonic surface rolling process device and the movement trajectory of the lifting support rod, the movement of the ultrasonic surface rolling process device and the lifting support rod, so as to complete strengthening of the surface to be machined of the blade.

Further, step S4 further comprises:

controlling, by the control system, the spindle turntable to rotate continuously such that a cross-sectional contour line of the opposite surface to the surface to be machined of the blade is kept perpendicular to an axis of the lifting support rod, a contact point between the ultrasonic surface rolling process device and the surface to be machined of the blade is on the axis of the lifting support rod, and the direction of the ultrasonic surface rolling process device is always in a normal direction of the surface to be machined of the blade.

According to the robot machining system and control method for ultrasonic surface rolling process of an aircraft engine blade of the present application, the robot is used to assist in clamping the ultrasonic rolling device and cooperates with the three-dimensional mobile lifting device and the flexible follow-up support head; and the robot, the spindle turntable and the three-dimensional mobile lifting device are cooperatively controlled, such that the accurate ultrasonic surface rolling process of an aircraft engine blade is realized. The advantages of high degrees of freedom, strong accessibility and good precision of the robot are used to realize ultrasonic surface rolling process in the normal direction of the surface of the aircraft engine blade. Moreover, the flexible follow-up support head effectively solves the problems of deformation and flutter caused by high-frequency and high-amplitude ultrasonic vibration rolling strengthening of the aircraft engine blade in the process of ultrasonic surface rolling process. After ultrasonic surface rolling process, the roughness of the surface of the aircraft engine blade can be effectively reduced, the hardness of the blade surface can be increased, and beneficial residual compressive stress is introduced into the blade, which is ultimately expected to prolong the service life of the aircraft engine.

BRIEF DESCRIPTION OF THE DRAWINGS

FIG. 8 is an enlarged view of portion III in FIG. 5;

FIG. 9 is a schematic flow chart of a robot machining control method for ultrasonic surface rolling process of an aircraft engine blade provided in another embodiment of the present application;

DESCRIPTION OF THE EMBODIMENT

The preferred embodiments of the present application are provided with reference to the accompanying drawings and will be described in detail.

Figure 1:
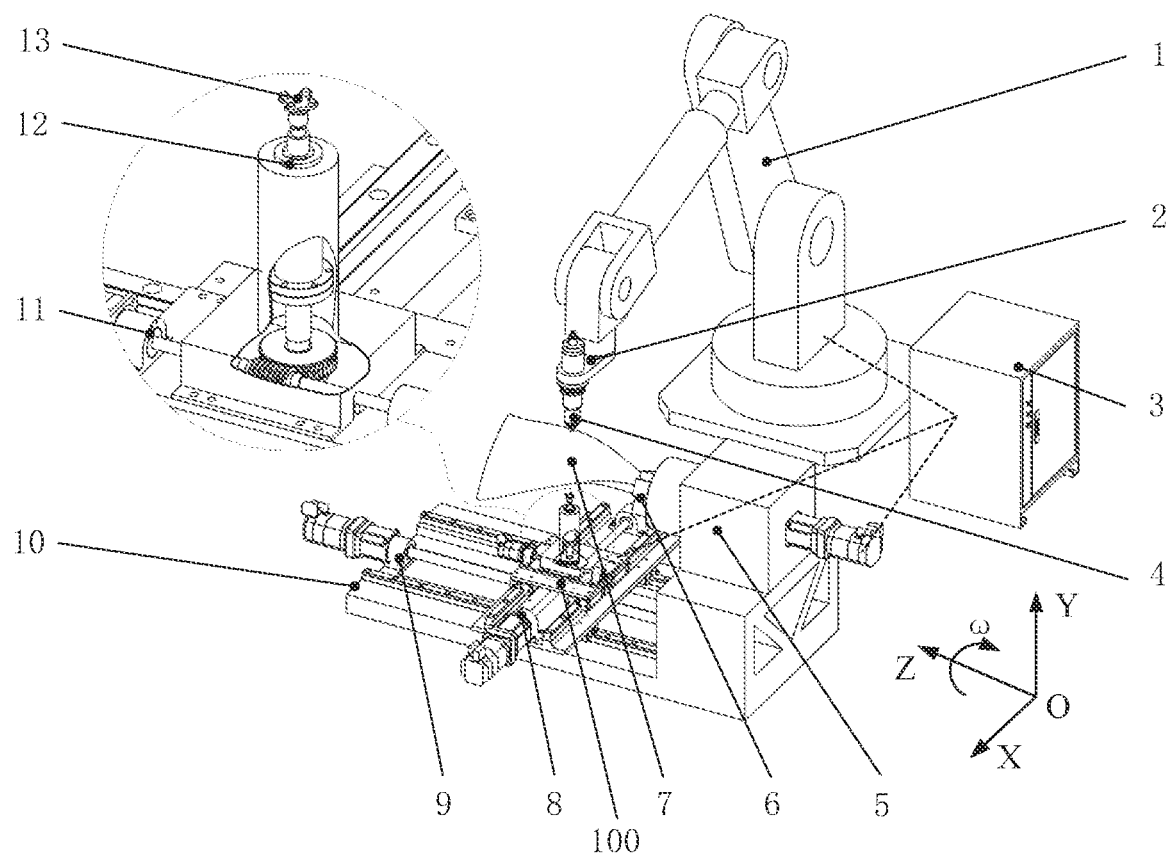
FIG. 1 is a schematic structural diagram of a robot machining system for ultrasonic surface rolling process of an aircraft engine blade provided in an embodiment of the present application.

It should be noted that, for ease of description, the present application defines a coordinate system O-XYZ as shown in FIG. 1, ω indicating a direction of rotation about a Z-axis.

EMBODIMENT I

As shown in FIG. 1, an embodiment of the present application provides a robot machining system for ultrasonic surface rolling process of an aircraft engine blade, the robot machining system comprising a robot 1, a base 10 and a control cabinet 3. An ultrasonic surface rolling process device 4 is fixed to the robot 1, and the robot drives the ultrasonic surface rolling process device 4 to move. The base 10 is provided with a spindle turntable 5 and a three-dimensional mobile lifting device 100, the spindle turntable 5 is provided with a blade clamp 6 for clamping an aircraft engine blade 7 to be machined, and the clamp 6 may rotate about a Z-direction, thereby driving the blade 7 to rotate about the Z-direction. A flexible follow-up support head 13 is fixed to the three-dimensional mobile lifting device 100, and the three-dimensional mobile lifting device drives the support head 13 to complete the movement in three directions of X, Y and Z. The control cabinet 3 is provided with a control system, the control system is in electrical connection or communication connection with the robot 1, the spindle turntable 5 and the three-dimensional mobile lifting device 100 respectively, and the three move in a cooperative manner. Dotted lines in FIG. 1 represent the electrical connection or communication connection.

In a machining process, the ultrasonic surface rolling process device 4 is located above the flexible follow-up support head 13, and the two are respectively located at an upper side and a lower side of the blade 7. The flexible follow-up support head 13 supports the blade, and the ultrasonic surface rolling process device 4 is used to perform ultrasonic surface rolling process on the surface of the blade 7. The control system of the control cabinet 3 controls the movement of the robot 1 (i.e. controlling a motion trajectory of the ultrasonic surface rolling process device 4), the rotation of the spindle turntable 5 (i.e. the rotation of the blade 7), and the movement of the three-dimensional mobile lifting device 100 (i.e. the movement of the flexible follow-up support head 13); and through cooperation of the three parts, ultrasonic surface rolling process of the surface of the blade 7 is completed.

The robot 1 may be a multi-degree-of-freedom joint robot, such as a five-axis or six-axis joint robot, so as to meet the requirements of machining a curved surface of the blade 7.

The ultrasonic surface rolling process device 4 may be connected to the robot 1 via a connection device 2, and is fixed to an end effector of the robot 1, such that the ultrasonic surface rolling process device 4 may perform strengthening in a normal direction of the surface of the blade 7 under the control of the robot 1.

Specifically, the connection device 2 may be a conventional tool connection device in the prior art, such as a flange, a bolt and a fastener, which is not limited in the present application.

The ultrasonic surface rolling process device 4 may be any one of strengthening devices in the prior art, and generally comprises an ultrasonic generator, a force sensor, a spring, an ultrasonic transducer, an ultrasonic horn, a rolling ball and a necessary fixture. The ultrasonic transducer converts a high-frequency electrical signal of the ultrasonic generator into a vibration signal, which is transmitted and amplified by the ultrasonic horn, and finally reaches the surface of a workpiece to be machined under the action of the rolling ball, thereby completing ultrasonic surface rolling process.

Figure 2:
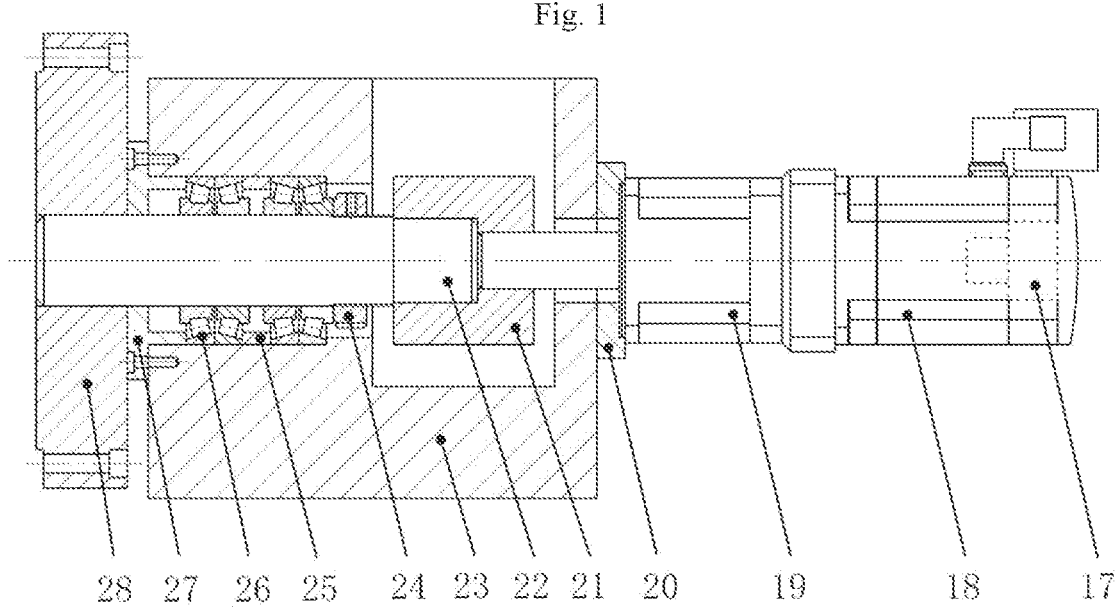
FIG. 2 is a schematic structural diagram of a spindle turntable provided in an embodiment of the present application.

As shown in FIG. 2, the spindle turntable 5 may comprise a rotary encoder 17, a servo motor 18, a reducer 19, a reducer mounting plate 20, a coupling 21, a rotary spindle 22, a turntable base 23, a locking nut 24, a bearing spacer ring 25, tapered roller bearings 26, a bearing end cover 27, and a transition disk 28. The servo motor 18 is connected to an input shaft of the reducer 19, the reducer 19 is fixed to the turntable base 23 via the reducer mounting plate 20, the rotary spindle 22 is connected to an output shaft of the reducer 19 via the coupling 21, two pairs of tapered roller bearings 26 are placed in the turntable base 23 to support the rotary spindle 22, the bearing spacer ring 25 separates the two pairs of tapered roller bearings 26 from each other, the locking nut 24 and the bearing end cover 27 are used to fix the two pairs of tapered roller bearings 26, and the transition disk 28 is connected to an output end of the rotary spindle 22. The blade clamp 6 is arranged on the transition disk 28, such that the blade clamp 6 rotates under the drive of the servo motor. The servo motor 18 is internally provided with the rotary encoder 17 for measuring the rotational speed and realizing fast speed regulation. The control system is electrically connected to the servo motor and the rotary encoder respectively, and the servo motor and the rotary encoder are controlled, so as to control the blade 7 to achieve an accurate angle of rotation.

Figure 3:
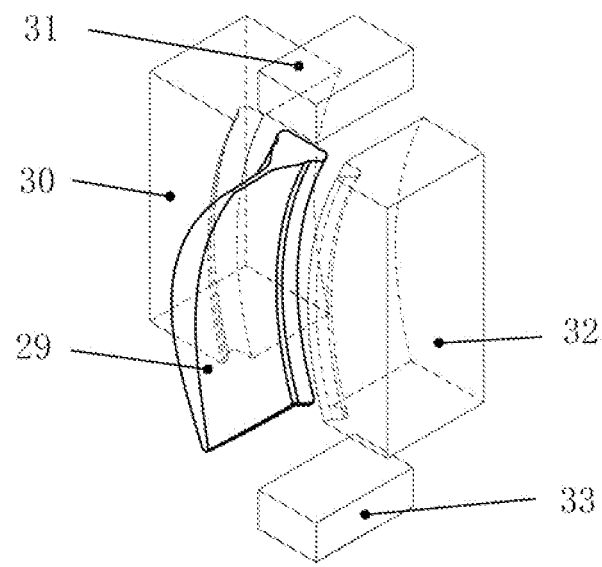
FIG. 3 is a schematic structural diagram of a blade clamp provided in an embodiment of the present application.

As shown in FIG. 3, the blade clamp 6 is designed and manufactured, depending on the installation of the blade 7 of the aircraft engine on an aviation turbine disk, according to a tenon portion 29 of the blade by means of an "inverted mold". Specifically, the blade clamp 6 comprises an upper press block 31, a lower press block 33, a left clasping block 30 and a right clasping block 32, which are used to clamp the tenon portion of the blade 6.

Figure 4:
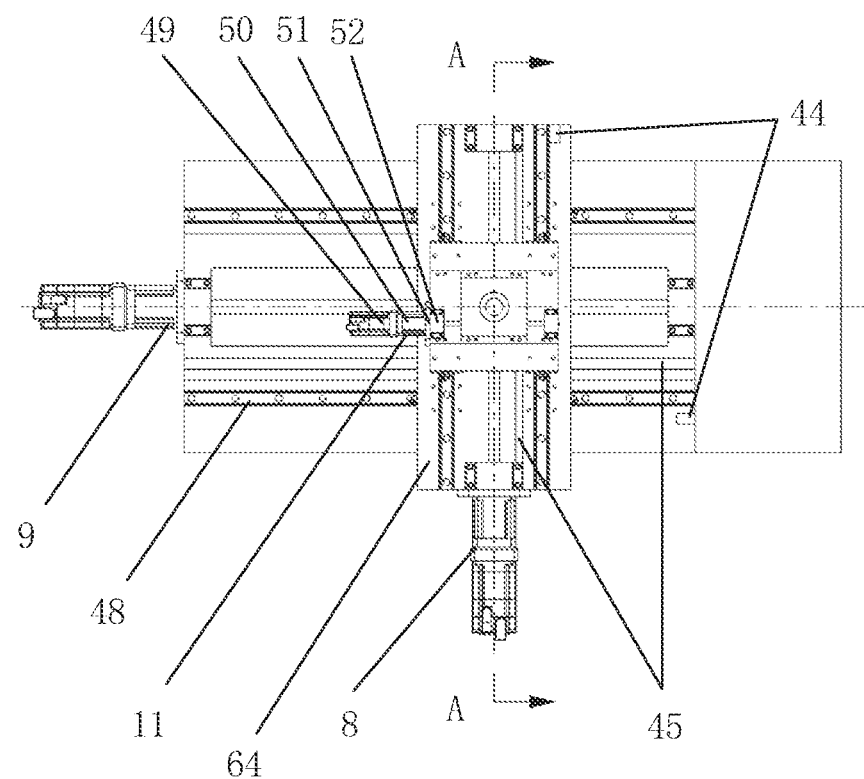
FIG. 4 is a top view of a three-dimensional mobile lifting device provided in an embodiment of the present application.

As shown in FIGS. 1 and 4, the three-dimensional mobile lifting device comprises an X-direction movement drive device 8, a Y-direction lifting drive device 11, a Z-direction movement drive device 9 and a lifting support rod 12. The X-direction movement drive device 8, the Y-direction lifting drive device 11 and the Z-direction movement drive device 9 jointly realize three-dimensional movement of the lifting support rod 12. The Z-direction movement drive device 9 is arranged on the base 10, the X-direction movement drive device 8 is connected to the Z-direction movement drive device 9, the Y-direction lifting drive device 11 is connected to the X-direction movement drive device 8, the lifting support rod 12 is connected to the Y-direction lifting drive device 11, the Z-direction movement drive device 8 may drive the X-direction movement drive device 8 to move in a Z-direction, the X-direction movement drive device 8 may drive the Y-direction lifting drive device 11 to move in an X-direction, the Y-direction lifting drive device 11 may drive the lifting support rod 12 to move in a Y-direction, and in this way, under the cooperation of the three, the three-dimensional movement of the lifting support rod 12 may be realized.

Specifically, as shown in FIGS. 4 to 7, the Z-direction movement drive device 9 is a ball screw drive structure, which comprises a servo motor 34 (i.e. a first actuator), a reducer 35, a flat key 36, a first ball screw 37, a reducer mount 38, bearing end covers 39, locking nuts 40, bearing seats 41, radial ball bearings 42, a sleeve 43, a laser displacement sensor 44, a grating scale 45, a screw nut pair 46, and a screw nut seat 47 arranged in the Z-direction. The screw nut pair 46 and the screw nut seat 47 are a first screw nut, the reducer mount 38 and the bearing seats 41 are respectively fixed at two ends of the base 10, and the servo motor 34 is fixed to an output end of the reducer 50. Two ends of the first ball screw 37 are respectively mounted into the bearing seats 41 via the double-row radial ball bearings 42. The double-row radial ball bearing 42 is fixed by the bearing end cover 39, the locking nut 40 and the sleeve 43; the locking nut 40 and the sleeve 43 are used to fix an inner race of the radial ball bearing 42, and the bearing end cover 39 is used to fix an outer race of the radial ball bearing 42. The bearing end cover 39, through which the ball screw 37 passes, is fixed to the bearing seat 41. One end of the first ball screw 37 is connected to an output shaft of the reducer 50 via the flat key 36, and the other end thereof is fixed to the bearing seat 41. The ball screw 37 passes through the screw nut seat 47, and the two form the screw nut pair 36, so as to convert the rotation of the ball screw 37 into the movement of the screw nut seat 47, such that the screw nut seat 47 can move freely in the Z-direction. The laser displacement sensor 44 is fixed to the base 10 for detecting the linear displacement of the Z-direction movement drive device. The grating scale 45 is composed of a scale grating 45-1 and a grating reading head 45-2. The scale grating 45-1 is fixed to the base 10, the grating reading head 45-2 is mounted at the bottom of a mounting plate 64, and the scale grating 45-1 cooperates with the grating reading head 45-2 to provide real-time feedback of a Z-direction movement position.

The X-direction movement drive device 8 and the Z-direction movement drive device 9 have structurally the same structure, both of which are of a ball screw drive structure. Compared with the Z-direction movement drive device 9, the X-direction movement drive device has an additional mounting plate 64. The mounting plate 64 is fixed to the screw nut seat 47 of the Z-direction movement drive device 9, and a servo motor (i.e. a second actuator), a second ball screw, a screw nut seat and a screw nut pair (i.e. a second screw nut), a reducer and other components of the X-direction movement drive device are arranged on the mounting plate 64, so that the X-direction movement drive device 8 can move freely in the Z-direction, and the installation thereof is the same as the Z-direction movement drive device 9, which will not be described herein.

Specifically, a guide rail 48 may also be provided on the base 10 in the Z-direction, and the mounting plate 64 is provided with a sliding groove matching the guide rail 48, so that the X-direction movement drive device 8 may slide on the guide rail 48.

Figure 5:
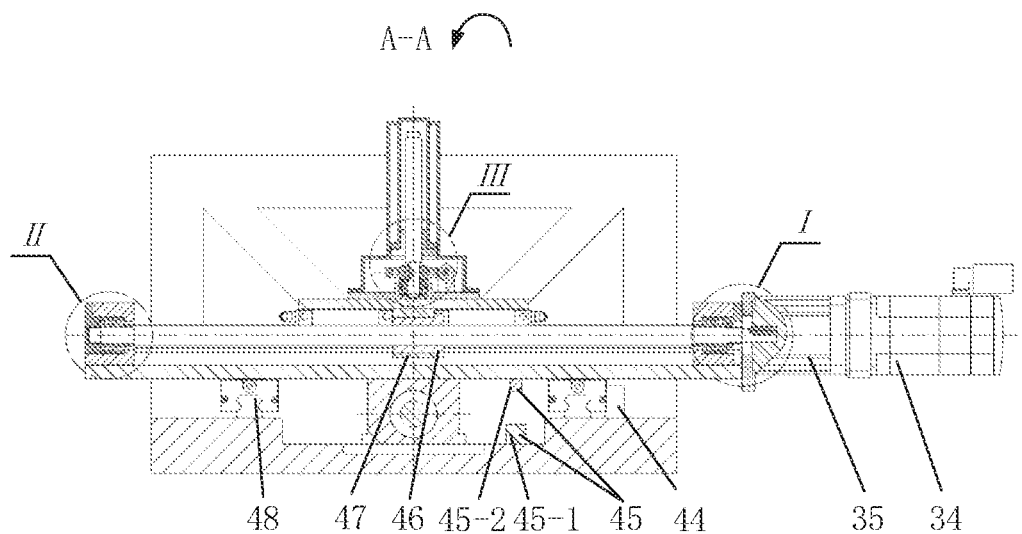
FIG. 5 is a cross-sectional view taken along A-A of FIG. 4.
Figure 6:
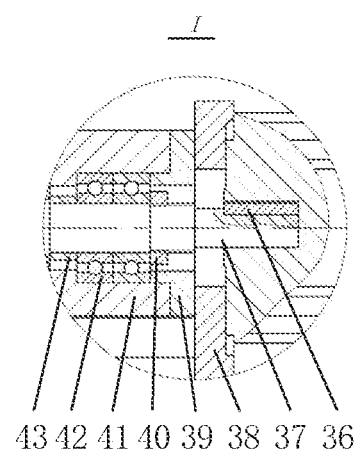
FIG. 6 is an enlarged view of portion I in FIG. 5.
Figure 7:
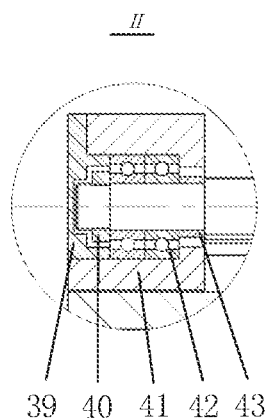
FIG. 7 is an enlarged view of portion II in FIG. 5.

As shown in FIGS. 4, 5 and 8, the Y-direction lifting drive device 11 comprises a servo motor 49 (i.e. a third actuator), a reducer 50, a reducer mount 51, a worm bearing seat 52, a lifting baseplate 53, a locking nut 54, a screw bearing seat 55, a radial ball bearing 56, a bearing spacer ring 57, a thrust bearing 58, a worm gear 59, a worm 60, a ball screw 61 (i.e. a third ball screw), a screw nut pair 62 (i.e. a third screw nut), and a lifting device housing 63. The lifting baseplate 53 is fixed to the screw nut seat 47 (i.e. the second screw nut) of the X-direction movement drive device 8, so that the lifting baseplate 53 can move freely in the Z-direction. The reducer mount 51, the worm bearing seat 52, and the screw bearing seat 55 are all fixed to the lifting baseplate 53, the reducer 50 is mounted on the reducer mount 51, and the servo motor 49 is connected to an input shaft of the reducer 50. Two ends of the worm 60 are both mounted to the bearing seat 52, with one end being connected to an output shaft of the reducer 50, the ball screw 61 being arranged in the Y-direction, and the other end being fixed to the screw bearing seat 55. The ball screw 61 passes through the screw nut pair 62 and is in driving fit with same, and the lifting support rod 12 is connected to the screw nut pair 62 and slides in the lifting device housing 63. The worm gear 59 is mounted on the lifting baseplate 53 and is engaged with the worm 60 and the ball screw 61 respectively. In this way, under the action of the servo motor 49, the worm 60 is driven to rotate, then the worm 60 drives the worm gear 59 to rotate, and the worm gear 59 then drives the ball screw 61 to rotate, so that the screw nut pair 62 moves in the Y-direction, and the lifting support rod 12 moves in the Y-direction. The thrust bearing 58, the bearing spacer ring 57, the radial ball bearing 56, and the locking nut 54 are sequentially mounted at a lower end of the ball screw 61, half of the radial ball bearing 56 and half of the thrust bearing 58 are fixed into the screw bearing seat 55, the radial ball bearing 56 is used to ensure normal rotation of the ball screw 61, the thrust bearing 58 is used to ensure normal rotation of the worm gear 59, the bearing spacer ring 57 is used to separate the radial ball bearing layer 56 from the thrust bearing 58, the locking nut 54 and the ball screw 61 are in threaded connection to fix an inner race of the radial ball bearing 61, and the lifting device housing 63 is fixed to the lifting baseplate 53.

Since the flexible follow-up support head 13 is connected to the lifting support rod 12, the three-dimensional movement of the flexible follow-up support head 13 may also be realized.

The flexible follow-up support head 13 may be any one of flexible follow-up support devices in the prior art, and generally comprises a plurality of balls, a ball support rod, a force sensor, a spring and other parts. The ball support rod is connected to the spring to form a flexible support for supporting the balls, the balls are connected to the ball support rod, the force sensor is connected to the spring for real-time monitoring of the magnitude of the support force, and when in use, the plurality of balls are in contact with the blade 7, thereby achieving the function of flexible support.

In a feasible implementation, the control cabinet 3 in the robot machining system for ultrasonic surface rolling process of an aircraft engine blade according to the present application may also be replaced with a control console on which a control device such as a computer or a PLC is placed, so as to realize accurate ultrasonic surface rolling process of the blade 7 by means of cooperative control over the robot 1, the spindle turntable 5 and the three-dimensional mobile lifting device 100.

According to the robot machining system for ultrasonic surface rolling process of an aircraft engine blade provided in the embodiments of the present application, the robot is used to assist in clamping the ultrasonic rolling device and cooperates with the three-dimensional mobile lifting device and the flexible follow-up support head; and the robot, the spindle turntable and the three-dimensional mobile lifting device are cooperatively controlled, such that the accurate ultrasonic surface rolling process of an aircraft engine blade is realized. The advantages of high degrees of freedom, strong accessibility and good precision of the robot are used to realize ultrasonic surface rolling process in the normal direction of the surface of the aircraft engine blade. Moreover, the flexible follow-up support head effectively solves the problems of deformation and flutter caused by high-frequency and high-amplitude ultrasonic vibration rolling strengthening of the aircraft engine blade in the process of ultrasonic surface rolling process. After ultrasonic surface rolling process, the roughness of the surface of the aircraft engine blade can be effectively reduced, the hardness of the blade surface can be increased, and beneficial residual compressive stress is introduced into the blade, which is ultimately expected to prolong the service life of the aircraft engine.

EMBODIMENT II

As shown in FIG. 9, this embodiment provides a robot machining control method for ultrasonic surface rolling process of an aircraft engine blade, the method comprising at least the following steps.

At step S1, a robot machining system for ultrasonic surface rolling process of an aircraft engine blade according to embodiment I is provided, the blade clamp 6 clamps a tenon portion of the blade 7, a surface to be machined of the blade 7 faces the ultrasonic surface rolling process device 4, and the flexible follow-up support head 13 supports an opposite surface to the surface to be machined.

At step S2, according to a model of the blade, a zigzag machining trajectory of the ultrasonic surface rolling process device is generated in an equal cross-section method.

Figure 10:
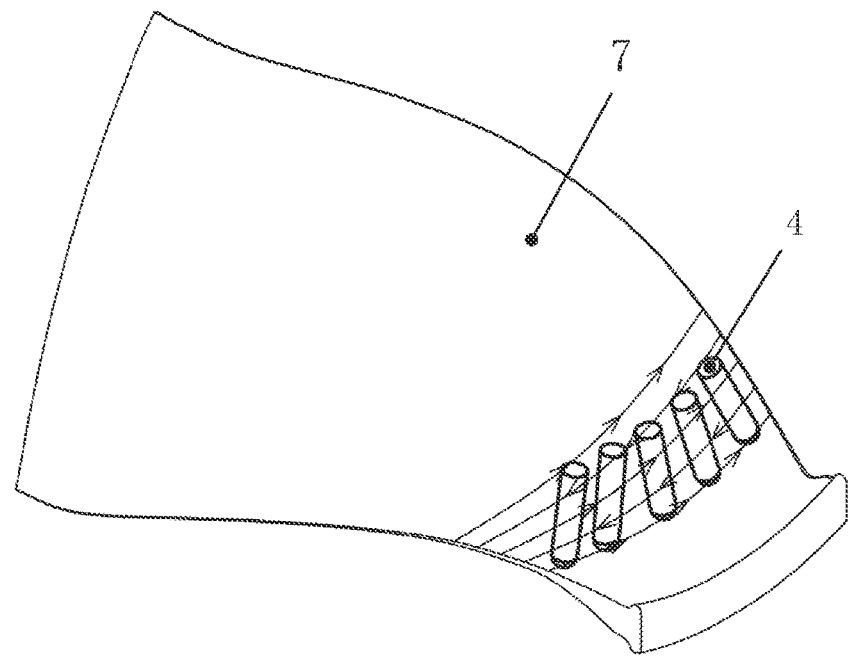
FIG. 10 is a schematic diagram of a machining trajectory for an aircraft engine blade provided in another embodiment of the present application.

Specifically, according to a CAD model of the blade 7, the machining trajectory of the ultrasonic surface rolling process device 4 is generated in the equal cross-section method. The equal cross-section method is a kind of machining trajectory planning method, that is, when the trajectory is being generated, the intersections of a plurality of equidistant parallel planes and the blade are used as the machining trajectory. As shown in FIG. 10, the direction of the arrow in the figure is the machining trajectory of the ultrasonic strengthening device 4, which is "zigzag", the machining efficiency of the zigzag machining trajectory is higher, the generated machining trajectory is input into the control system, the control system controls the robot 1, and then the robot 1 drives the ultrasonic surface rolling process device 4 to machine the blade 7 along the generated machining trajectory.

At step S3, a movement trajectory of a lifting support rod is generated according to the machining trajectory of the ultrasonic surface rolling process device.

Specifically, since the flexible follow-up support head 13 needs to support the blade 7 in the process of machining, the flexible follow-up support head 13 needs to move together with the machining trajectory of the ultrasonic surface rolling process device 4, while the movement trajectory of the flexible follow-up support head 13 is determined by the movement of the lifting support rod 12. After the machining trajectory of the ultrasonic surface rolling process device 4 is generated, the movement trajectory of the lifting support rod 12 can be calculated, the movement trajectory is also input into the control system, the control system controls the three-dimensional mobile lifting device, and then the three-dimensional mobile lifting device drives the lifting support rod 12 and the flexible follow-up support head 13 to move according to the generated movement trajectory.

At step S4, a control system controls, according to the machining trajectory of the ultrasonic surface rolling process device and the movement trajectory of the lifting support rod, the movement of the ultrasonic surface rolling process device and the lifting support rod, so as to complete strengthening of the surface to be machined of the blade.

Specifically, the control system simultaneously controls the movement of the ultrasonic surface rolling process device 4 and the lifting support rod 12, and also controls the spindle turntable 5 to rotate continuously such that a cross-sectional contour line of the opposite surface of the surface to be machined of the blade 7 is kept perpendicular to an axis of the lifting support rod 12, a contact point between the ultrasonic surface rolling process device 4 and the surface to be machined of the blade 7 is on the axis of the lifting support rod, and the direction of the ultrasonic surface rolling process device 4 is always in the normal direction of the surface to be machined of the blade 7.

Figure 11:
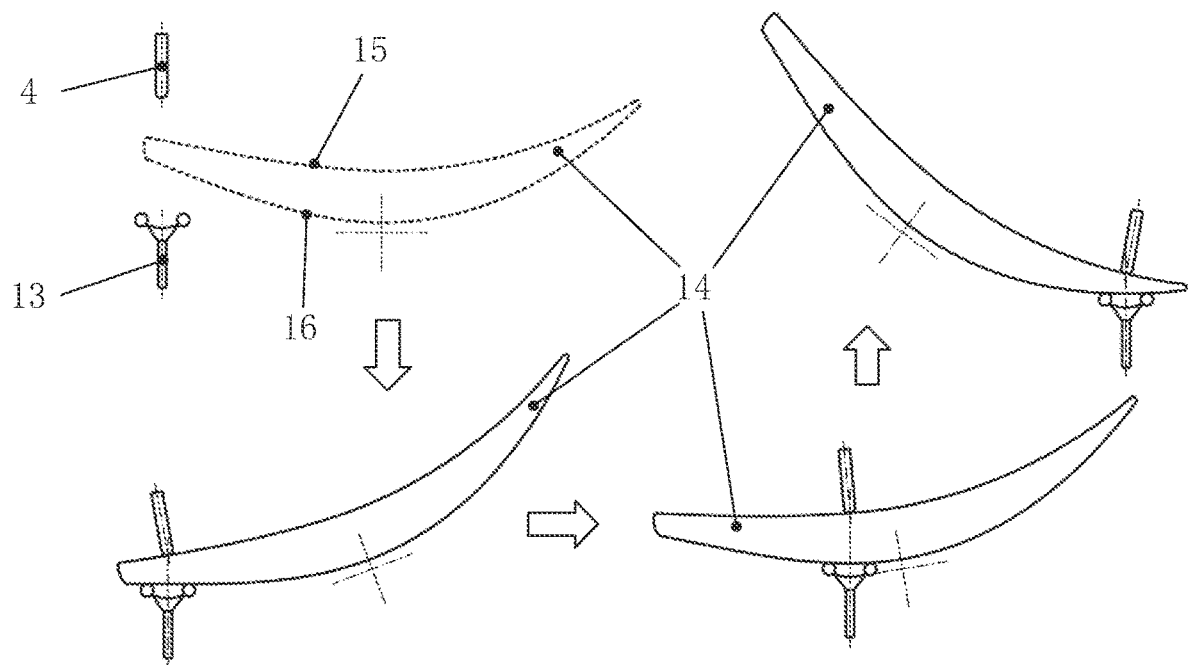
FIG. 11 is a schematic diagram of a machining process for an aircraft engine blade provided in another embodiment of the present application.

As shown in FIG. 11, a machined cross-section 14 of the blade 7 is taken as an example to specifically introduce the control method for ultrasonic surface rolling process of the aircraft engine blade, a contour line of the machined cross-section 14 is divided into a pressure side 15 of the cross-section contour line and a suction side 16 of the cross-section contour line according to the naming method of a blade profile. If the pressure side 15 of the machined cross-section 14 of the blade 7 is subjected to ultrasonic surface rolling process, the flexible follow-up support head is supported on the suction side 16 of the cross-section contour line. Firstly, according to the CAD model of the blade, a zigzag machining trajectory of the ultrasonic surface rolling process device 4 is generated in an equal cross-section method, as shown in FIG. 10. Then, the movement trajectory of the flexible follow-up support head 13 and the movement trajectory of the lifting support rod 12 are generated according to the machining trajectory. The control system controls the ultrasonic surface rolling process device 4 and the flexible follow-up support head 13 to move according to the machining trajectory and the movement trajectory, respectively, thereby completing strengthening of the surface to machined of the blade 7.

As shown in FIG. 11, the direction of the arrow in the figure is the machining direction of the machined surface 14. In the machining process, the blade 7 continuously rotates such that the suction side 16 is kept perpendicular to the axis of the lifting support rod, the contact point between the ultrasonic surface rolling process device 4 and the pressure side 15 is on the axis of the lifting support rod 12, and the direction of the ultrasonic surface rolling process device 4 is always in the normal direction of the blade surface where the contact point is located, so as to ensure that the ultrasonic surface rolling process device is always kept perpendicular to the blade surface, maximizing the introduction of ultrasonic rolling energy into the blade 7 of the aircraft engine.

According to the robot machining control method for ultrasonic surface rolling process of an aircraft engine blade in this embodiment, the robot, the spindle turntable and the three-dimensional mobile lifting device are cooperatively controlled, such that the accurate ultrasonic surface rolling process of an aircraft engine blade is realized.

Only preferred embodiments of the present application are described above, and are not intended to limit the scope of the present application, and it is also possible to make various changes to the above embodiments of the present application. That is, all simple, equivalent changes and modifications made according to the claims and the description of the present application of application fall within the scope of protection of the claims of the present patent of application. The content not described in detail in the present application is conventional technical content.

What is claimed is:

1. A robot machining system for ultrasonic surface rolling process of an aircraft engine blade, the robot machining system comprising:
   robot, to which an ultrasonic surface rolling process device is fixed, and the robot drives the ultrasonic surface rolling process device to move;
   base, provided with a spindle turntable and a three-dimensional mobile lifting device, the spindle turntable being provided with a rotatable blade clamp, and a flexible follow-up support head being fixed to the three-dimensional mobile lifting device; and
   a control system, which is in electrical connection or communication connection with the robot, the spindle turntable and the three-dimensional mobile lifting device.

2. The robot machining system for ultrasonic surface rolling process of an aircraft engine blade according to claim 1, wherein the robot is a five-axis or six-axis robot.

3. The robot machining system for ultrasonic surface rolling process of an aircraft engine blade according to claim 1, wherein the spindle turntable comprises a servo motor, a reducer, a turntable base, a rotary spindle, a transition disk and a rotary encoder, wherein the reducer is fixed to the turntable base, the servo motor is connected to an input shaft of the reducer, the rotary spindle is connected to an output shaft of the reducer, the transition disk is connected to the rotary spindle, the rotatable blade clamp is arranged on the transition disk, the rotary encoder is built in the servo motor, and the control system is electrically connected to the servo motor and the rotary encoder.

4. The robot machining system for ultrasonic surface rolling process of an aircraft engine blade according to claim 1, wherein the three-dimensional mobile lifting device comprises a lifting support rod, an X-direction movement drive device, a Y-direction lifting drive device, and a Z-direction movement drive device; and the Z-direction movement drive device is arranged on the base, the X-direction movement drive device is connected to the Z-direction movement drive device, the Y-direction lifting drive device is connected to the X-direction movement drive device, and the lifting support rod is connected to the flexible follow-up support head.

5. The robot machining system for ultrasonic surface rolling process of an aircraft engine blade according to claim 4, wherein the Z-direction movement drive device comprises a first actuator, a first ball screw, and a first screw nut, wherein the first ball screw is arranged on the base in a Z-direction, the first actuator is connected to the first ball screw, and the first ball screw passes through the first screw nut and is in driving fit with the first screw nut.

6. The robot machining system for ultrasonic surface rolling process of an aircraft engine blade according to claim 5, wherein the X-direction movement drive device comprises a mounting plate, a second actuator, a second ball screw, and a second screw nut, wherein the mounting plate is fixed to the first screw nut, the second ball screw is arranged on the mounting plate in an X-direction, the second actuator is connected to the second ball screw, and the second ball screw passes through the second screw nut and is in driving fit with the second screw nut.

7. The robot machining system for ultrasonic surface rolling process of an aircraft engine blade according to claim 6, wherein the Y-direction lifting drive device comprises a lifting baseplate, and a third actuator, a worm gear, a worm, a third ball screw and a third screw nut arranged on the lifting baseplate, wherein the third ball screw is arranged in a Y-direction, the third actuator is connected to the worm, the worm gear is engaged with the worm and the third ball screw, the third ball screw passes through the third screw nut and is in driving fit with the third screw nut, and the lifting support rod is connected to the third screw nut.

8. The robot machining system for ultrasonic surface rolling process of an aircraft engine blade according to claim 1, wherein the rotatable blade clamp comprises an upper press block, a lower press block, a left clasping block and a right clasping block.

9. The robot machining system for ultrasonic surface rolling process of an aircraft engine blade according to claim 1, further comprising a control cabinet, in which the control system is arranged.

10. A robot machining control method for ultrasonic surface rolling process of an aircraft engine blade, the method comprising at least:
   step S1: providing a robot machining system for ultrasonic surface rolling process of the aircraft engine blade, causing a blade clamp to clamp a tenon portion of the aircraft engine blade, causing a surface to be machined of the aircraft engine blade to face a ultrasonic surface rolling process device, and a flexible follow-up support head supporting an opposite surface to the surface to be machined;
   step S2: generating, according to a model of the aircraft engine blade, a zigzag machining trajectory of the ultrasonic surface rolling process device in an equal cross-section method;
   step S3: generating a movement trajectory of a lifting support rod according to the zigzag machining trajectory of the ultrasonic surface rolling process device; and
   step S4: controlling, by a control system according to the zigzag machining trajectory of the ultrasonic surface rolling process device and the movement trajectory of the lifting support rod, the movement of the ultrasonic surface rolling process device and the lifting support rod, so as to complete strengthening of the surface to be machined of the aircraft engine blade.

11. The robot machining control method for ultrasonic surface rolling process of an aircraft engine blade according to claim 10, wherein step S4 further comprises:
   controlling, by the control system, a spindle turntable to rotate continuously such that a cross-sectional contour line of the opposite surface to the surface to be machined of the aircraft engine blade is kept perpendicular to an axis of the lifting support rod, a contact point between the ultrasonic surface rolling process device and the surface to be machined of the aircraft engine blade is on the axis of the lifting support rod, and a direction of the ultrasonic surface rolling process device is always in a normal direction of the surface to be machined of the aircraft engine blade.

* * * * *